United States Patent [19]

Nishikubo

[11] Patent Number: 5,182,320

[45] Date of Patent: Jan. 26, 1993

[54] MATERIAL FOR LIGHT-HEAT ENERGY ACCUMLATION AND CONVERSION

[75] Inventor: Tadaomi Nishikubo, Tokyo, Japan

[73] Assignee: Research Development Corporation of Japan, Chiyoda, Japan

[21] Appl. No.: 678,433

[22] Filed: Apr. 1, 1991

[30] Foreign Application Priority Data

Mar. 31, 1990 [JP] Japan .................................. 2-85793
Mar. 31, 1990 [JP] Japan .................................. 2-85794
May 29, 1990 [JP] Japan .................................. 2-138875

[51] Int. Cl.$^5$ ........................ C08K 5/34; C08F 8/00; C08F 136/00
[52] U.S. Cl. ..................... 524/88; 525/193; 526/283
[58] Field of Search ............... 526/283; 524/88

[56] References Cited

U.S. PATENT DOCUMENTS 4,394,858  7/1983  Giordano et al. ................. 126/400
4,424,805  1/1984  Neary ............................... 126/452

FOREIGN PATENT DOCUMENTS 0055897 12/1981 European Pat. Off. .
0123493  4/1984 European Pat. Off. .
61-179287 1/1986 Japan .

OTHER PUBLICATIONS

T. Iizawa, C. Hijikata, and T. Nishikubo, Macromolecules 25, 21–26, 1992.

Primary Examiner—Joseph L. Schofer
Assistant Examiner—Wu C. Cheng
Attorney, Agent, or Firm—Wenderoth, Lind & Ponack

[57] ABSTRACT

The present invention provides a material for light-heat energy accumulation and conversion comprising a composition of a high-molecular compound having norbonadien derivative group as side chain with a catalytic matter converting a quadrycylan derivative group of high-molecular side chain into the norbonadien derivative group.

The invention also provides a material for light-heat energy accumulation and conversion, characterized by putting to an esterification reaction high-molecular compounds having an epoxy group as side chain with norbonadien carbonic acid or its derivative.

4 Claims, 10 Drawing Sheets

MATERIAL FOR LIGHT-HEAT ENERGY ACCUMLATION AND CONVERSION

FIELD OF INVENTION

This invention relates to a material for light-heat energy accumulation and conversion, more specifically, to an easy-to-handle and practical light-heat energy accumulation and conversion material which permits the accumulation and conversion of energy.

PRIOR ART

Norbonadien compounds have been conventionally known as having the function of light-heat energy accumulation and conversion. As shown in the following equation, norbonadien(NBD) and its derivatives are converted into the corresponding quadricyclane(QC) and its derivatives due to the radiation of ultraviolet rays and visible light. These quadricyclanes(QC) can be readily converted back into norbonadiens(NBD). During this re-conversion process, approx. 22 Kcal per one mole of molecule thermal energy is emitted. This energy is what the radiated light energy has been accumulated in quadricyclanes(QC) as strain energy.

For this reason, light reaction between norbonadiens(NBD)/quadricyclanes(QC) attracts attention as an excellent system of light-heat energy accumulation/conversion reaction.

However, this reaction systems heretofore known were all low-molecular compounds which consist of norbonadiens(NBD) or its derivatives, so that it was difficult to put their unique and attractive functions of light-heat energy accumulation and conversion into practical application in the form of low molecular compounds. In other words, it was virtually impossible to create functional materials for energy accumulation and conversion.

Considering these circumstances, the inventor of this invention has studied the development of the light-heat energy accumulation and conversion system consisting of the foregoing light reaction systems into functional material, and has already found that the introduction of norbonadiens derivatives into high-molecule side chain can realize a non low-molecular reaction system.

Yet, in order to convert quadricyclane(QC) derivatives to norbonadiens(NBD) or its derivatives, it was indispensable to use a catalyst solution.

Use of such solution constituted a great obstacle to the practical development of said light reacts system as functional material.

This invention has been achieved by continuing the efforts based on the studies made heretofore by the inventor of this instant invention and the development of high-molecular material systems for light-heat energy accumulation and conversion. Its object is to provide a new light-heat energy accumulation/conversion material of complete solid phase which will be able to be developed as practical materials.

SUMMARY OF THE INVENTION

The present invention provides a material for light-heat energy accumulation and conversion, consisting of high-molecular compound having norbonadiens as side chain and catalytic substances which convert the quadricyclane derivatives as high-molecular side chain into the norbonadien derivative group.

The material according to the present invention is characterized by a reaction system under complete solid phase condition, and can be shaped as film, sheet, bulk and other various forms.

The invention also provides a material for high-molecular beads light-heat energy accumulation and conversion, consisting of high-molecular beads having norbonadiens as side chain and catalytic substances which convert the quadricyclane derivative group as high-molecular side chain into the norbonadien derivative group.

The material according to the invention is characterized by a reaction system in which high-molecular materials exist as beads, and the material can be processed to a given size and shape consisting of various compositions, and to appropriate surface conditions.

The present invention also provides a material for light-heat energy accumulation and conversion, wherein high-molecular compounds having an epoxy group are esterification-reacted with norbonadien carbonic acid or its derivative group.

The invention also provides the forgoing materials characterized as a reaction system which is under complete solid phase condition, and compositions which consist of catalytic substances that convert a quadricyclane derivative group into a norbonadien derivative group.

DETAILED DESCRIPTION OF THE INVENTION

In the present invention, as high-molecular compounds having a norbonadien derivative group as side chain, the ones having a norbonadien derivative group expressed in the following equation in various high-molecular main chain construction.

(R denotes a linking construction to the high-molecular main chain, and $R_1$ to $R_7$ denote hydrogen atom, alkyl, cycloalkyl, alkenyl, cycloalkenyl, aryl, aryl alkyl, alkyl aryl, halogen, hydroquin, alkoxi, eter, ester, amine, amid, cyano, nitro and other significant organic groups.)

Specifically, the following can be illustrated.

(a)

(a-1) $R_0$: —Ph, PhCO, —PhO
(a-2) $R_0$: —COOH
(a-3) $R_0$: —COOR$_{10}$
  ($R_{10}$= , = )
(a-4) $R_0$: X—Ph—NH—CO—
  (X=H, CH$_3$, OCH$_3$
  Cl, NO$_2$, COCH$_3$
  COph, (NO$_2$)$_2$,
  (Cl)$_2$)
(a-5) $R_0$ : X—Ph—NR$_{11}$—CO—
  ($R_{11}$ = , Ph)

(b)

(c)

(d)

(e)

+CH$_2$—CH+
|
Ph—COO—Ph—[norbornene]—$R_0$ (f)

+CH$_2$—C(CH$_3$)+
|
Ph—COO—Ph—[norbornene]—$R_0$ (g)

+[CH$_3$-Ph]—O+
|
CH$_2$—OCO—[norbornene]—$R_0$ (h)

+Ph—N(CO)$_2$—Ph—(CO)$_2$N—Ph+
|
CH$_2$OCO—[norbornene]—$R_0$

Needless to say, the high-molecular compounds are not limited to these compounds illustrated.

The catalysts include cobalt-tetraphenylporphyrin complex(Co-TPP), cobalt-tetraphenylporphyrin tetracarbon acid complex, AgClO$_4$, cobalt-phthalocyanine complex, N,N-di-4-carboxyl-1, 2-phenindiiminate-cobalt complex and various other known catalysis, which can be used arbitrarily.

These catalysis may be used as solution or in the form of being absorbed to high-molecular beads and further in the form of causing to be existed in beads by other means. When it is used as a solution, it is extremely easy to handle the reaction system if high molecules are shaped as beads.

As for bead-shaped polymers, there are no special limitation on their kind.

As high-molecular compounds having an epoxy group as a side chain, various types can be employed, including the one denoted by the following equation.

($S_1$ and $S_2$ denote the main chain unit of high molecules, and n may be O. A indicates a given hydrocarbon group, whether aliphatic, cycloaliphatic, aromatic, while represents O or more than 1. $R_0$ indicates a connection of a given aliphatic, cycloaliphatic, aromatic hydrocarbon group and a functional group made up of oxygen, sulfur, nitrogen and other atoms or a connection of a hydrocarbon group therewith.)

On the other hand, a norbonadien carbonic acid derivative, the carbonic acid of norbonadien, having $R_1$ to $R_7$ substituents, the acid halognide thereof, the ester thereof, the metallic salt thereof, the ammonium salt thereof and other compounds.

On the following pages, detailed descriptions will be given while illustrating the reference synthesis example and embodiments of the instant invention.

REFERENCE 1

The polymer of the following equation was synthesized.

0.76 g (5 mol) polychloromethylstylene(PCMS) and 1.06 g (5 mol) 3-phenyl-2,5-norbonadien-2-carbonic acid were dissolved in 10 ml DMF, and 0.28 g (5 mol) KOH and 0.16 g (0.5 mol) tetrabutylammonium(TBAB) were added, allowing them to react at 50° C. for 72 hours. The reaction product was added to water, with a polymer suspended in it, and the polymer was purified twice with THF-methanol.

The yield of the polymer was 1.16 g.

The rate of introduction of NBD residue to the polymer side chain was 93% (calculated through a halogen analysis), and the viscosity was 0.18 dL/g (0.5 g/100 ml, in DMF at 30° C.).

REFERENCE 2

The polymer of the following equation was synthesized.

1.221 g (8 mol) PCNS and 3.520 g (12 mol) potassium salt of 3-(phenyl carbamoil)-2,5-norbonadien-2-carbonic acid were dissolved in 16 ml DMF, 0.258 g (0.8 mol) tetrabutylammonium(TBAB) were added as PTC, allowing them to react at 50° C. for 96 hours. As with Reference 1, the reaction product was added to water, with a polymer suspended in it, and the polymer was purified twice with THF-methanol.

The yield of the polymer was 2.015 g.

The rate of introduction of NBD to the polymer side chain was 97.0 mol-% (calculated through a halogen analysis).

The viscosity was 0.16 dL/g (at 0.5 g/dL in DMF at 30° C.)

REFERENCE 3

The polymer of the following equation was synthesized.

The reaction with the potassium salt (or sodium salt) of 2-chloroetyl vinyl eter synthesizes(2-vinyloxi) ethoxicarbonyl-3-phenyl-2,5-norbonadien(PNVE) in high yield, and the product was subjected to cationic polymerization using tri-phloroboron-eter complex catalyst.

2.26 g (8 mol)PNVE was dissolved in 8 ml toluene and cooled down to $-75°$ C. While being stirred, a toluene solution (0.8 mL) of 34.05 mg (0.24 mol) $BF_3$-$OEt_2$, a catalyst, was added, subjected to polymerization for three hours. A tiny amount of trietylamine was added to this, causing the polymerization, and the polymerized solution was added to methanol, to cause the polymer to precipitate. Then, the polymer was purified twice with THF-methanol.

A polymer with a yield of 1.72 g (yield 76.3%) and a viscosity 0.12 dL/g (0.5 g/dL in DMF at 30° C.) was provided.

REFERENCE 4

Synthesis of Polymer Beads

A substitution reaction between 3% crosslink poly(-chlorometylstylene) (0.854 gm 5 mol) and the potassium salt (1.467 g, 5 mol) PCNB(3-(phenyl-carbamoil)-2,5-norbonadien-2-carbonic acid) was conducted in DMF (12 mL) while stirring at 80° C. for 12 hours, in the presence of 161 g (0.5 mol) TBAB (tetrabutylammonium bromid) 10. After the reaction, the polymer beads were subjected to filter separation, and put to reflux cleaning twice with water, three times with methanol, and three times with aceton, then put to low-pressure drying at 50° C. The yield was 1.42 g. The esterification ratio was 96.4% (19.35 mg/g, according to halogen analysis). IR spetrum absorption (KBr) indicated an absorption of 1710, 1690(C=C), 1610(C=C), 1280 cm(C—O—C, ester).

Polymer beads of the construction according to the following equation was obtained.

Figure 1:
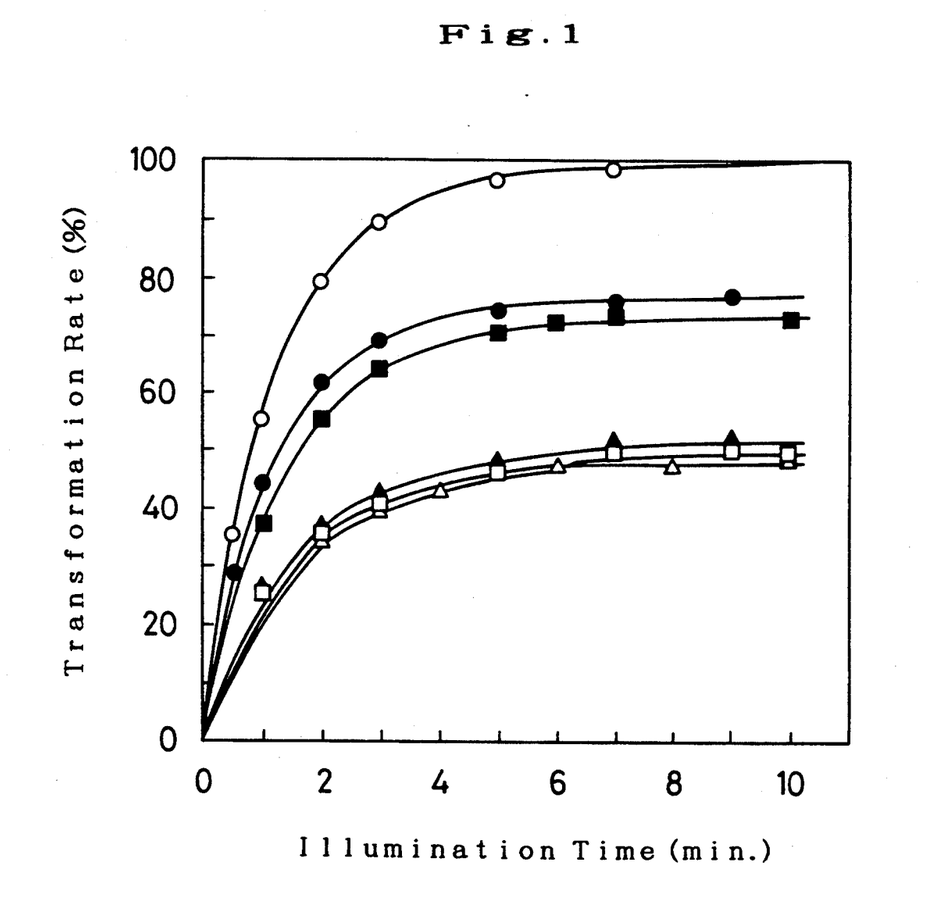
FIGS. 1, 2, 3, 4 and 5 are the measurement drawings illustrating the correlation between the conversion ratio and time of the synthesis example and embodiment of the polymer according to the instant invention.

At different reaction temperatures, the esterification ratio (conversion ratio) at various temperatures were obtained in FIG. 1. The result indicated that the reaction speed increases with increasing reaction temperatures, that the esterification reaches 96% at 80° C. in 12 hours and that re reaction proceeds quantitatively. Moreover, the polymer beads having —Ac and —$NO_2$ as a substitute (R) of NBD were subjected to a reaction at 80° C. for 12 hours. This revealed that an esterification reaction proceed quantitatively (R=Ac: 93.1%, R=$NO_2$: 97.7%).

REFERENCE 5

Synthesis of Polymer Beads 10.854 5 mol 3% crosslink poly(chlorometyl-stylene) and the potassium salt (1.276, 5 mol) PCNB were added to DMF (12 mL), then the product was added with DBU (1, 8-[5,4,0] undeca-7-en) (0.761 g, 5 mol), and put to a reaction at 60° C. for 12 hours. The cleaning of polymer beads after the reaction was conducted by the above procedure. The yield was 1.14 g. The esterification ratio was 78.5% (24.82 mg/g, according to halogen analysis).

REFERENCE 6

Synthesis of 3-phenyl-2,5-norbonadien-2-carnonic acid

The synthesis was made in accordance with the reaction formula (A).

20.9 g phenyl propyneic acid chloride was placed into a 100 ml flask, the 1.6 ml (0.25 mol) cyclopentadiene obtained by the cracking of dicyclopentadiene was added, then 0.4 g picric acid was added; some heat generation was recognized (at about 58° C.). An hour later, 8 ml (0.12 mol) cyclopentadiene was added and heated, then subjected to one-hour reflex treatment. After air-cooled, the product was pressure-reduced and distilled, removing unreacted cyclopentadiene, then dissolved in approx. 100 ml dry toluene. The substance was put into a separating funnel, and shaked severely with 5W % hydrogencarbonate and the water layer was collected. 20W % sulfuric water solution was added to the water layer for acid dipping. The crystal was funneled, and cleaned with weak acid to neutral water. After fully dried in a desicator, the product was put to recrystallization with n-hexane.

Yield: 11.2 g (yield rate: 41.5%)

Melting point: 134.0 ° to 135.0° C. (values represented in the literature 135° to 136° C.)

REFERENCE 7

Synthesis of copolymer of gly cigyl methacrylate (GMA) and metyl methacrylate (MMA)

34.117 g (0.24 mol) GMA and 6.007 g (0.06 mol) MMA were placed into a 200 ml three-neck flask, 90 ml dioxane and 0.75 mol AIBN were added as solvent and initiator, respectively. The mixture was put to one-hour nitrogen replacement, and to polymerization at 60° C. for five hours and at 80° C. for two hours. Collection was made by injecting the product into about 3 l n-hexane. The polymer obtained was dissolved in about 200 ml THF, and subjected to two reprecipitation with about 3 l n-hexane. After fully dried, in a DMF at 30°

C., the reduction viscosity was measured at C=0.5 g/dl. Epoxy equivalent was determined by the hydrochloric acid pyridine method. First, about 1 g sample was measured accurately, and put into a 100 ml flask. 20 ml hydrochloric acid pyridine liquid (16 ml concentrated hydrochloric acid+984 ml purified pyridine) were added for 30 min reflex. 20 ml hydrochloric solution was subjected to titration with 0.1N sodium hydroxide solution using phenolphthalein as indicator. The solution reflexed was put to similar titratin. Using the reactivity of the epoxy group in the polymer and hydrochloric acid, grams of the polymer(epoxy equivalent) for one epoxy group was determined based on the degree of reduction of hydrochloroc acid in the solution. This epoxy equivalent was used to give the GMA-MMA composition ratio.

A copolymer with a yield of 36.7 g (yield rate: 91.5%), GMA:MMA=7.1: 2.9 and an epoxy equivalent of 182.66 was provided.

REFERENCE 8

Synthesis of GMA Radical Polymer 49.745 (0.35 mol) GMa was put into a three-neck flask, a solvent and 1.75 mol AIBN was added as initiator, and subjected to one-hour nitrogen replacement. Then, the mixture was subjected to radical polymerization at 60° C. for five hours and at 80° C. for two hours. THF was added to the mixture, which was put into approx. 3 l n-hexane, collecting a polymer. The polymer was dissolved in FHF, and subjected to two reprecipitations with about 3l n-hexane. After dried and reduced in pressure, the product was measured for reduction viscosity in 30° C. DMF and C=0.5 g/dl. The epoxy equivalent was measured by the hydrochloric acid pyridine method as with the above. The ratio of epoxy content was determined by the epoxy equivalent.

A polymer of a yield of 35.2 g (a yield of 70.1%) and an epoxy equivalent of 154.63 was obtained.

REFERENCE 9

Reaction of GMA-MMA copolymer with 3-phenyl-2,5-norbonadien-2-carbonic acid (PNBA)

An esterification reaction was conducted according to the reaction formula(B). 1.827 g copolymer synthesized in embodiment 2 (10 ml epoxy group), 2.123 g (10 mol) PNBA synthesized in Embodiment 1, 0.097 g (0.3 mol, 3 mol %) TBAB as catalyst, 20 ml DMF as solvent, and a tiny amount of MQ were added into a 50 ml three-neck flask, and change in the addition reaction ratio over time was measured at 60° C., 70° C., and 80° C. and 90° C. Measurement of addition reaction ratio was accomplished by taking 1 ml solution exactly for each hour and titrating the carbonic acid in the alcoholic 0.1N potassium hydroxide with phenolphthalein as indicator. Based on the value titrated, the difference between the amount of carbonic acid in the PNBA and that of unreacted carbonic acid in the solution.

By an inverse operation from this value, the addition reaction ratio of the carbonic acid and the epoxy acid was determined. The result was indicated in FIG. 1.

Reaction Formula (B)

REFERENCE 10

Reaction of GMA-MMA copolymer with 3-phenylcarba-moil-2,5-norbonadien-2-carbonic acid (PCND)

Figure 2:
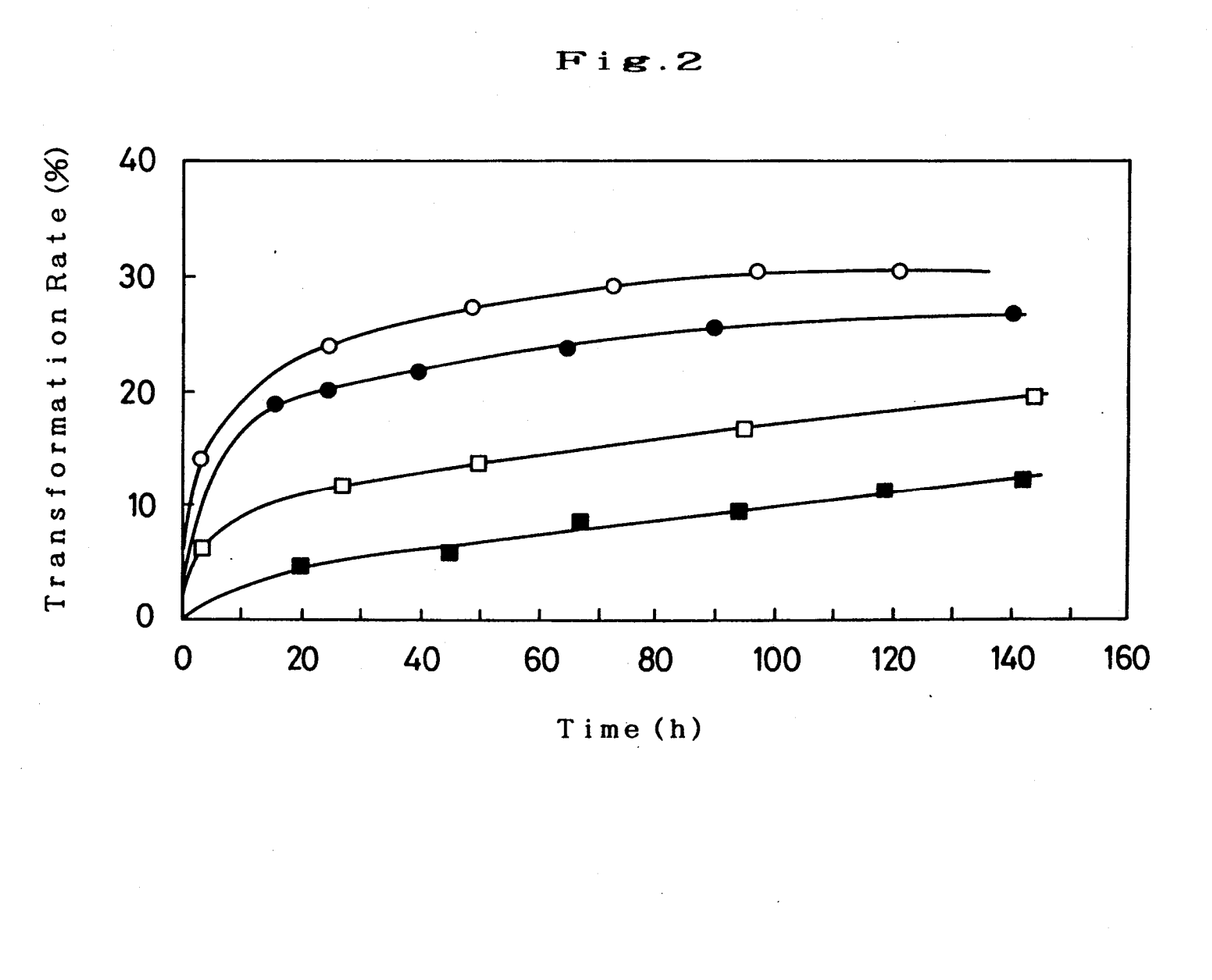

An esterification reaction was conducted according to the reaction formula(C). 1.827 g copolymer synthesized in Embodiment 2 (10 ml epoxy group), 2.553 g (10 mol) PCND synthesized in Embodiment 1, 0.097 g (0.3 mol, 3 mol %) TBAB as catalyst, 20 ml dehydrated DMF as solvent, and a tiny amount of MQ were added into a 50 ml three-neck flask, and change in the addition reaction ratio over time was measured at 80° C., 90° C. and 100° C. Measurement of addition reaction ratio was accomplished, as with the above reference, by a titration of unreacted carbonic acid. The result was shown in FIG. 2.

Reaction Formula (C)

-continued

Reaction Formula (C)

REFERENCE 11

As with Reference 9, with PNBA acid chloride as raw material, side chain ester compounds were provided.

The reaction proceeded smoothly, and a side chain esters at a high yield due to an addition reaction.

Compared with free carbonic acid of reference 9., gelation was controlled.

EMBODIMENT 1

0.01 g polymer having an NBD residue as side chains indicated in Reference 1 was dissolved in 3 ml THF, to prepare a polymer solution. Co-TPP was added to the NBD at a rate of 10, 15, 20, 30 and 40 mol % thereto, to prepare a mixture solution of polymer and catalyst. The mixture solution was applied on quartz cell and allowed to dry. Light was radiated to the polymer film on the quartz cell from a distance of 30 cm using a 250-W ultrahigh pressure mercury lamp. From the reduction ratio of UV spetra ($\lambda$max 297 nm) before and after the light radiation, the light reaction ratio was determined. Accordingly, the NBD residue in the polymer film containing Co-TPP as indicated in FIG. 1 was converted into QC quantitatively in about seven minutes of light radiation, but in a polymer film containing 5 or 10 mol-% Co-TPP, equilibrium was reached when the reaction ratio was around 70 to 75% and 40 to 45% respectively, since an isomerization reaction from NBD to QC occurred due to light radiation and the resultant QC was converted back into NBD due to the contact with Co-TPP. This means that heat was generated concurrently with light radiation. Light radiation was given to respective polymer films for ten minutes, and measurements were taken as to the re-conversion ratio of QC residue into NBD group in the resultant polymer. The result was shown in FIG. 2. As is apparent from FIG. 2, polymer films which contain higher content of Co-TPP show the tendency to increase the conversion ratio from QC to NBD. This also indicates that the polymer films containing Co-TPP are being gradually converted into NBD while heat was being radiated after light radiation.

Figure 3:
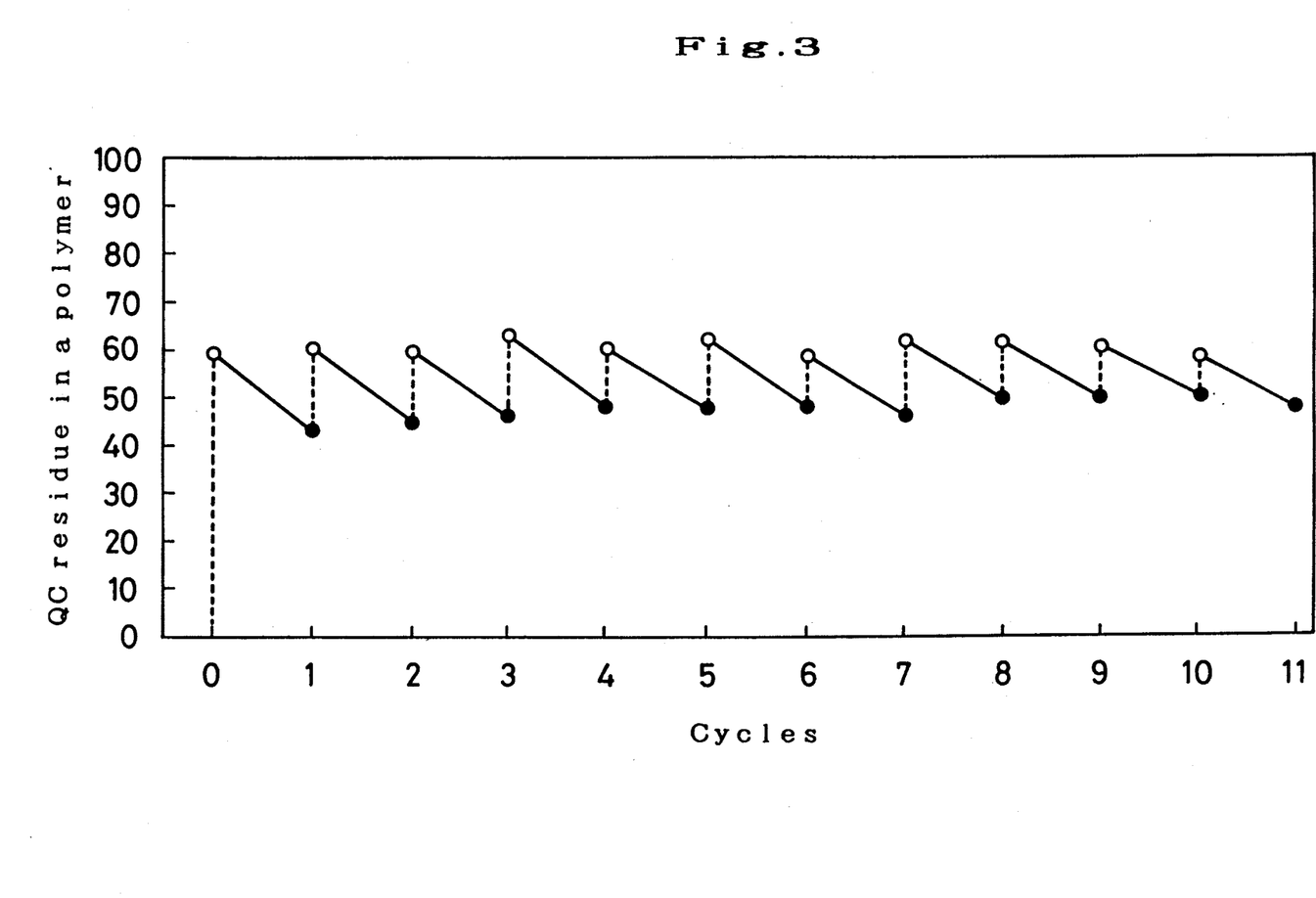

FIG. 3 indicates a cycle of light-heat conversion reaction of the polymer film containing 40 mol % Co-TPP. This polymer film has about 60% of NBD isomerized into QC by a ten-minute light radiation. 60 mol % QC residue in the resultant polymer film was reduced to 40 mol % due to a catalytic reaction after allowed to stand for twenty-four hours. Thereafter, a similar 10-minute light radiation resulted in the QC content in the polymer film being recovered up to 60%, indicating that more than 10 recycles are possible.

EMBODIMENT 2

Figure 4:
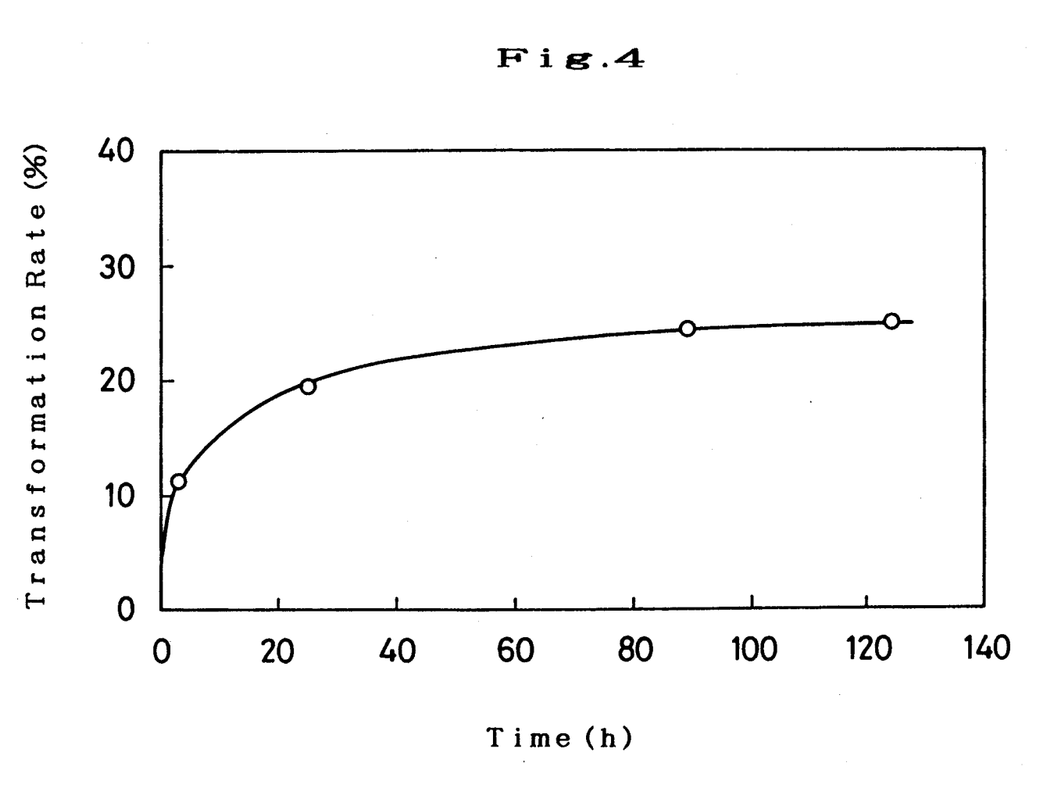
Figure 5:
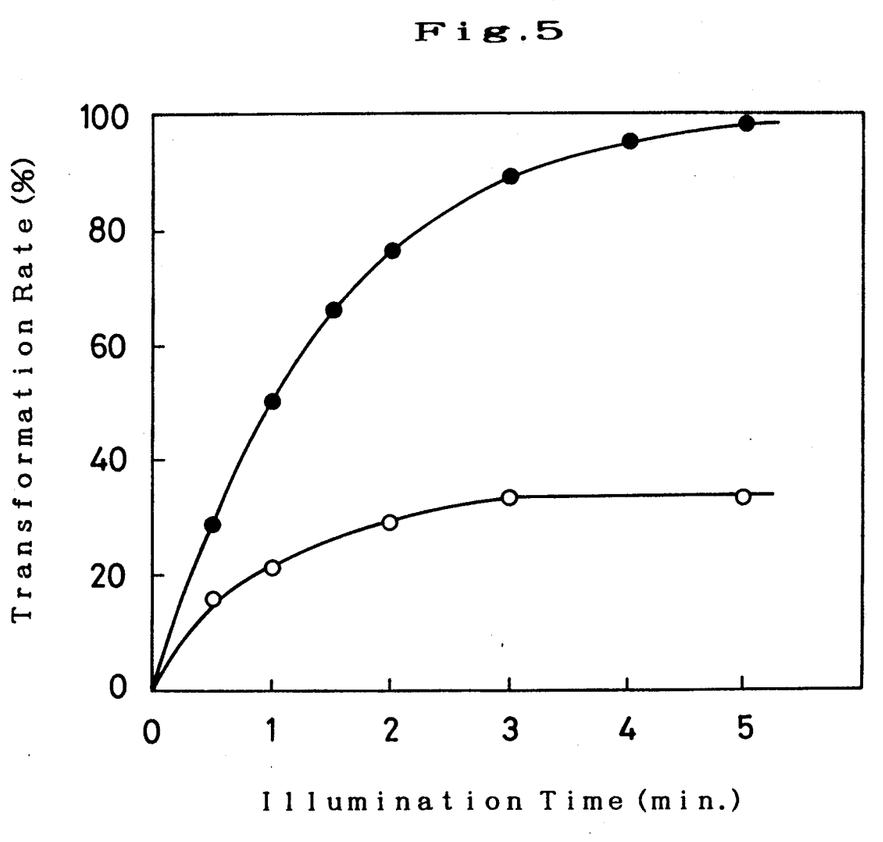
Figure 6:
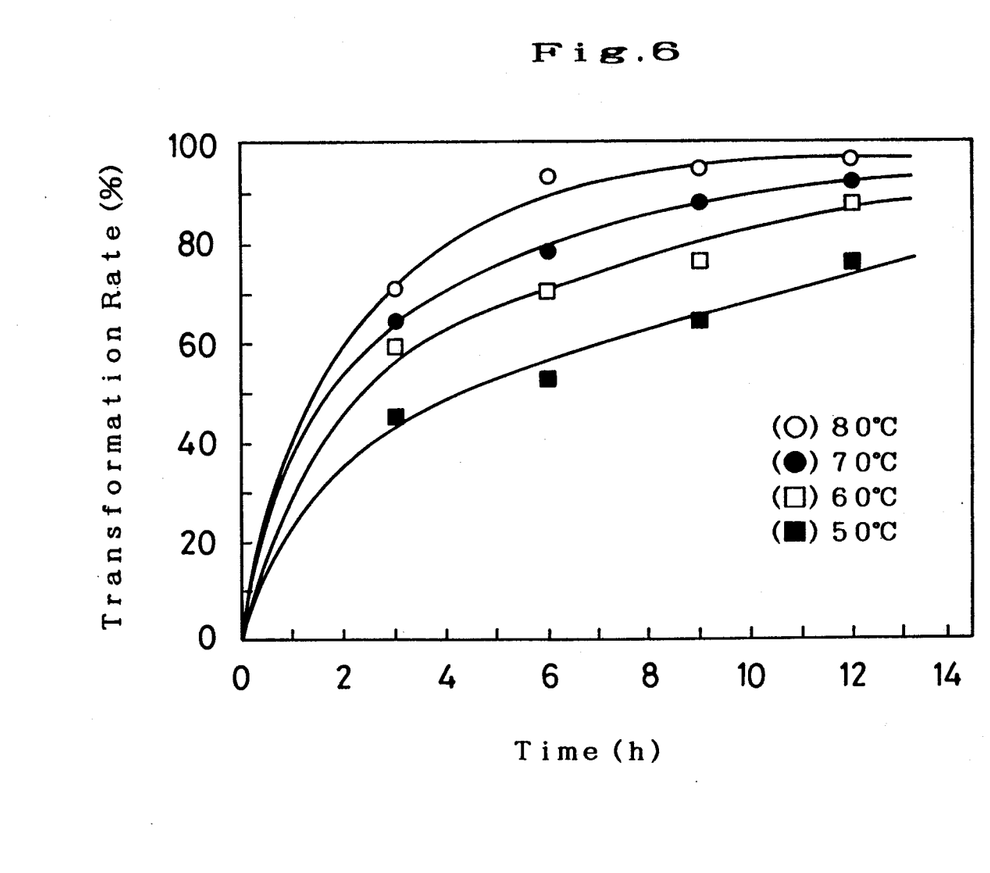
FIG. 6 is a correlation drawing illustrating the time and esterification conversion ratio for the synthesis examples of the polymer beads of the instant invention.

Films of the polymer alone as synthesized in Reference 3 and of this polymer and Co-TPP were prepared on a quartz cell, and measurements were taken as to the light reaction thereof and the inverse isomerization reaction of QC residue in the resultant polymer film. The results were shown in FIG. 4 and 5. As was indicated by these results, in the case of the polymer film consisting singularly of the polymer alone, the reaction ratio of NBD reached 100% in five minutes of light radiation, while in the case of the polymer film including Co-TPP, the conversion ratio of NBD reached equilibrium at about 30 mol % (FIG. 4). In addition, if the polymer film containing Co-TPP subjected to light radiation was allowed to stand at room temperatures, the QC residue of the resultant polymer side chain was gradually re-converted into NBD (FIG. 5). This indicates that the functional film comprised of a polymer and Co-TPP converts light energy to heat energy.

EMBODIMENT 3

Figure 7:
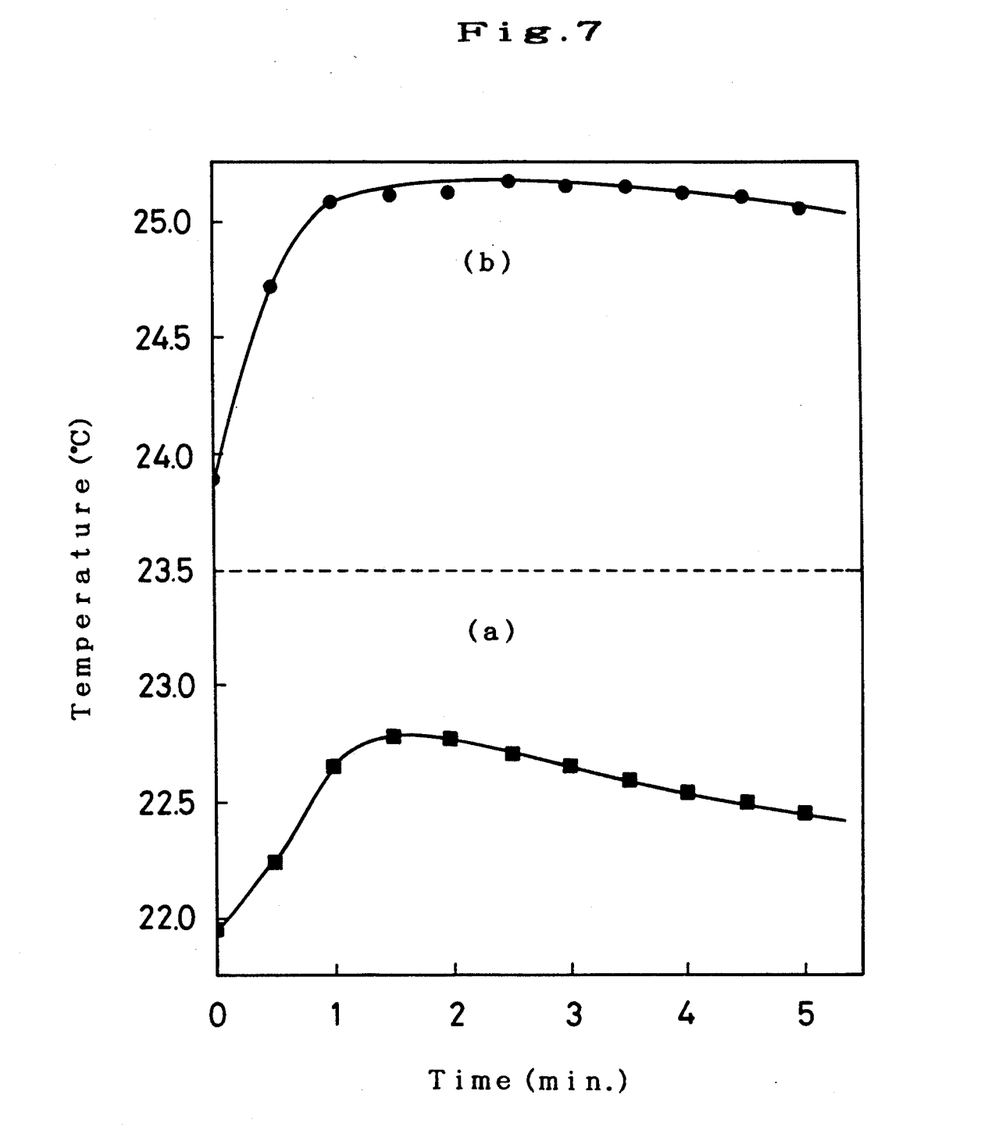
FIG. 7 is a correlation drawing between the time and temperature for the embodiments of the present invention.
Figure 8:
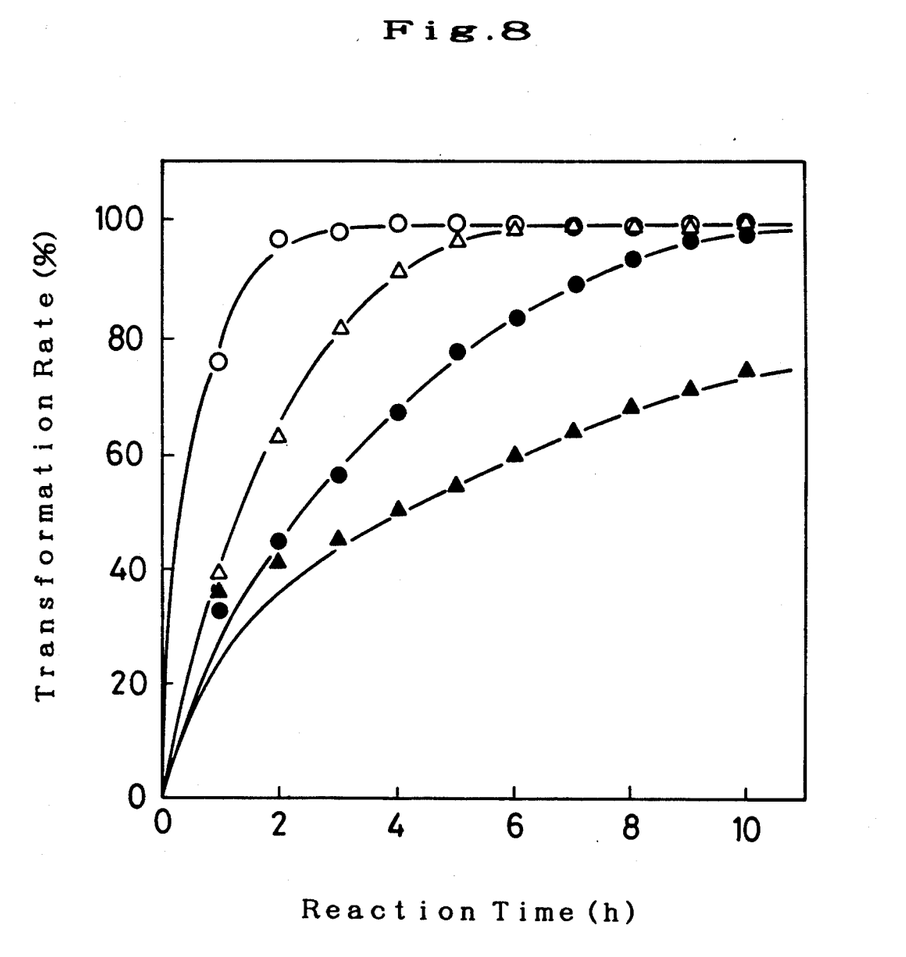
FIG. 8 and 9 are correlation drawings between reaction time and conversion ratio, illustrating the changes over time of the esterification addition reaction.
Figure 9:
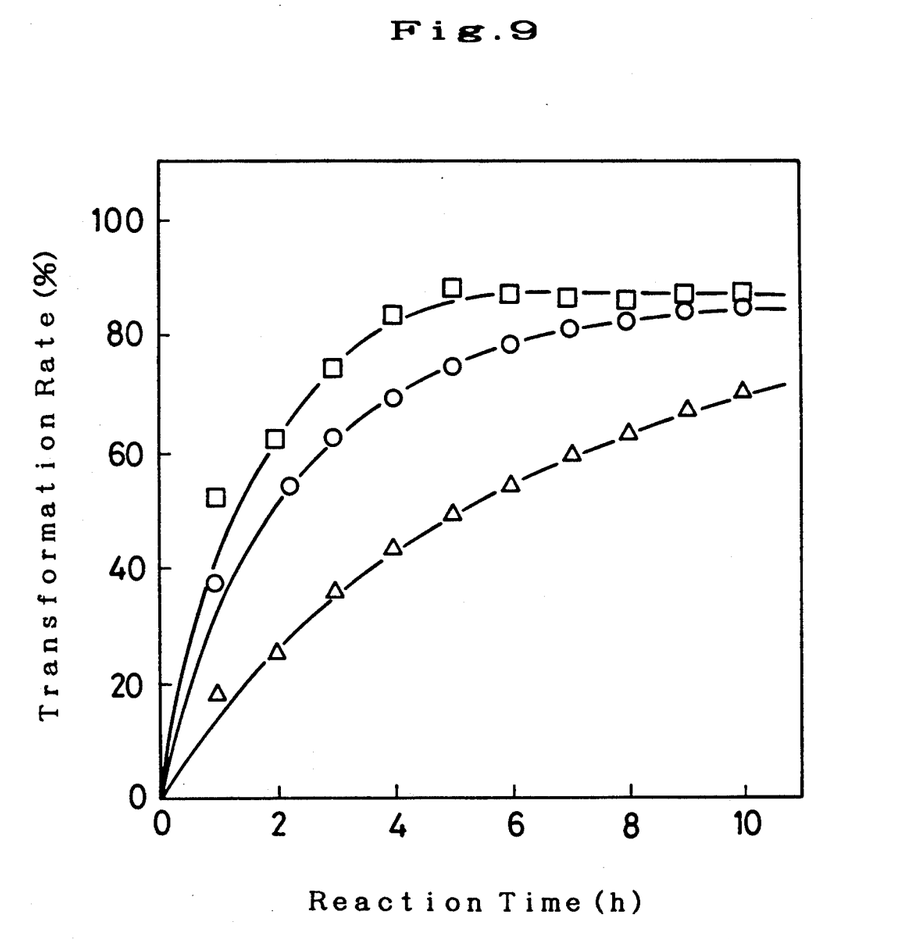

After light radiation was applied to polymer beads (5.0 g) having PCNB residue as side chain with a 250 W ultrahigh pressure mercury lamp, the beads were added to 40 mL (9.0×10⁵ mol/L) Co-TPP catalytic solution, and measurements were taken as to the temperature increase of this solution. The results were shown in FIG. 7(a). The temperature of the Co-TPP solution before the polymer beads were added stood at 21.8° C. Shortly after the light-radiated polymer beads were added, the temperature rose up one, then dropped, and rose up again. The first temperature rise was due to the fact that the temperature of the polymer beads themselves were a little higher than those of the Co-TPP solution. Thereafter, the QC residue of the side chain of the polymer beads was subjected to an inverse isomerization reaction due to the Co-TPP catalyst, and a heat generation phenomenon was observed. The maximum temperature rise was observed 90 seconds after the polymer beads were added, and the temperature at that time was 22.7° to 30° C.

The result is lower than the theoretical value, but it could be because:

i) since light was radiated directly to the polymer beads powder, light was reflected on the surface of the polymer beads, and part of the NBD residue on the beads surface was isomerized, and no quantitative isomerization did not proceed.

ii) the active sites of Co-TPP catalyst is prevented from acting on the QC residue inside the beads due to the steric hindrance with the polymer beads, there is no sufficient inverse isomerization.

iii) the reasons of above i) and ii) are combined.

EMBODIMENT 4

For polymer beads having a PCNB residue which possesses an acetoxy replacement group at P-position of the phenyl group, temperatures were measured in similar manners as Embodiment 3. The result was indicated in FIG. 7(b).

EMBODIMENT 5

Isomerization Reaction of Light Valence

A small amount of polymers in which PNBAZ, PCND and PCND derivatives (methoxy type) and (acetyle type) were introduce into a copolymer synthesized in Reference 7 were taken, dissolved in THF, applied on a quartz cell and subjected to external light radiation using a 250 W high-pressure mercury lamp, for light reaction.

It was revealed that the NBD residue was efficiently subjected to an isomerization reaction of light valence into the corresponding QC derivative.

Figure 10:
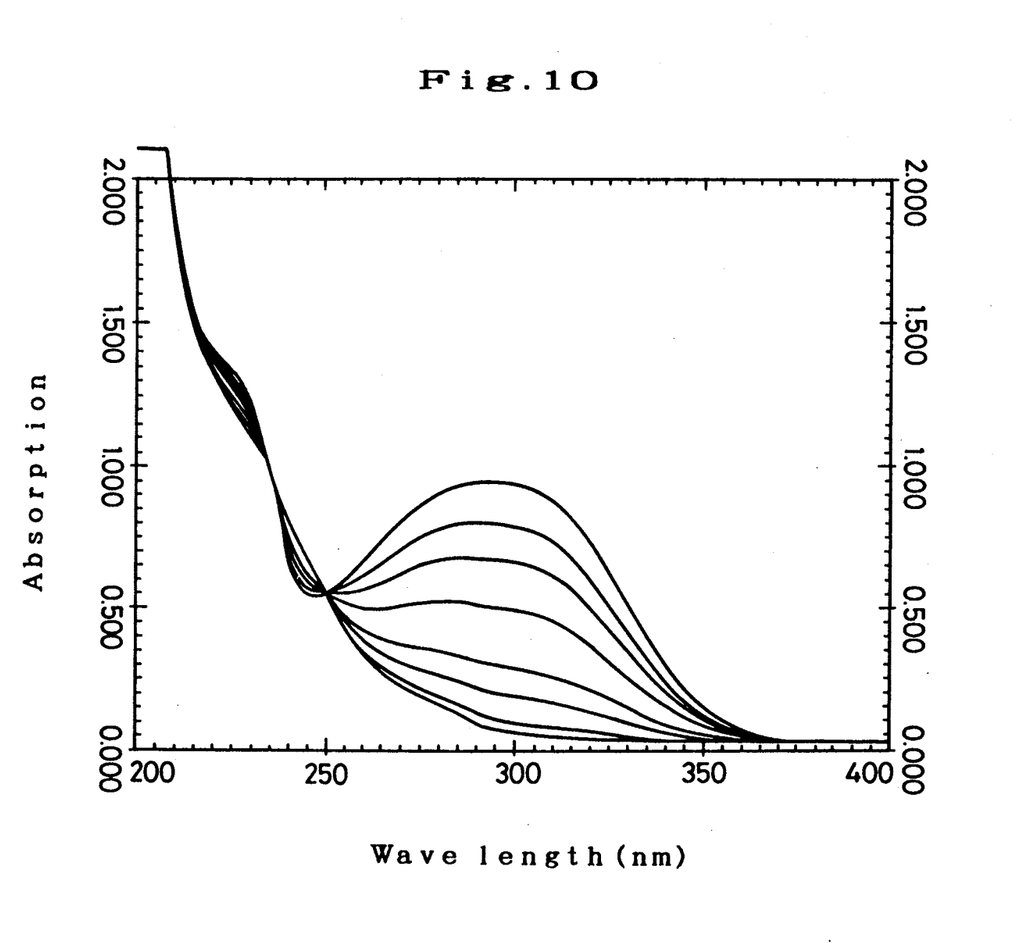
FIG. 10 is a correlation drawing between wavelength and absorption of a light isomerization reaction.

Conversion into a QC derivative for a PNBA induction high-molecular compound is shown as changes in ultraviolet ray absorption spectrum in FIG. 10. The radiation times(min.) 0, 0.25, 0.5, 1, 2, 3, 5 and 10 were represented from above in the figure.

EMBODIMENT 6

0.01 g polymer having an NBD residue as a side chain as indicated in Reference 9 was dissolved in 3 ml THF, to prepare a polymer solution. Co-TPP were added to the polymer solution at a rate of 10, 15, 20, 30 and 40 mol % to the NBD residue, to prepare a mixture solution of polymer and catalyst. This mixture solution was applied on a quartz cell and allowed to dry. Light was radiated to the polymer film obtained in the quartz cell at a distance of 30 cm with a 250 W ultrahigh pressure mercury lamp. The light reaction ratio was determined on the basis of the reduction ratio of UV spectra before and after the light radiation. As a result, the NBD residue in the polymer film containing no Co-TPP was converted quantitatively to QC after about seven minutes of light radiation. However, in the polymer films containing 5 or 10 mol-% Co-TPP, the reaction ratio from NBD to QC reached an equilibrium at about 70-75% and 40-45% due to an NBD-QC isomerization reaction resulting from light radiation and also due to the fact that the QC generated at the same time was converted because of a contact with Co-TPP. This signifies that heat is generated concurrently with the light radiation. Light was radiated to the various polymer films for ten minutes, and measurements were taken as to the reconversion ratio of the QC residue in the polymer produced to the NBD residue. The polymers with higher contents of Co-TPP in the polymer film show tendency to increase the conversion rate from QC to NBD. This also indicates that the polymer film containing Co-TPP is gradually converted into NBD while emitting heat after subjected to light radiation.

EMBODIMENT 7

The films consisting of the polymer alone synthesized in Reference 10 and of this polymer and Co-TPP were prepared on a quartz cell, measurements being taken as to the light reaction thereof and the inverse isomerization reaction of the QC residue in the polymer film. From this result, in the case of film consisting of the polymer alone, the reaction rate of NBD attained j100% after six minutes of light radiation, but in the case of the polymer film containing Co-TPP, the conversion rate of NBD reached an equilibrium at approx. 30 to 40 mol %. Moreover, if the light-radiated polymer film containing Co-TPP was allowed to stand at room temperatures, the QC residue of the polymer side chain generated was reconverted gradually into NBD. This suggests that a functional film consisting of polymer and Co-TPP converts light energy to heat energy.

What is claimed is:

1. A material for light-heat energy accumulation and conversion comprising a composition in solid form of a polymer having a norbonadien derivative group as a side chain, capable of converting into the corresponding quadrycyclan derivative group in the presence of light, and a cobalt complex catalyst compound capable of converting the quadrycyclan derivative group back to the original norbonadien derivative group, said catalyst being present in an amount sufficient to accomplish this conversion.

2. A material according to claim 1 in the form of a film.

3. A material according to claim 1 in the form of beads.

4. A material according to claim 1 in which the cobalt catalyst compound is selected for the groups consisting of a cobalt-tetraphenylporphyrin complex, a cobalt-tetraphenylporphyrin tetracarbon acid complex, a cobalt-phthalocyanine complex, and an N,N-di-4-carboxyl-1,2-phenindiiminate-cobalt complex.

* * * * *